Aug. 19, 1941.                F. A. HOWARD                2,253,299
                              ROTARY CLUTCH
              Original Filed Jan. 3, 1933          6 Sheets-Sheet 6

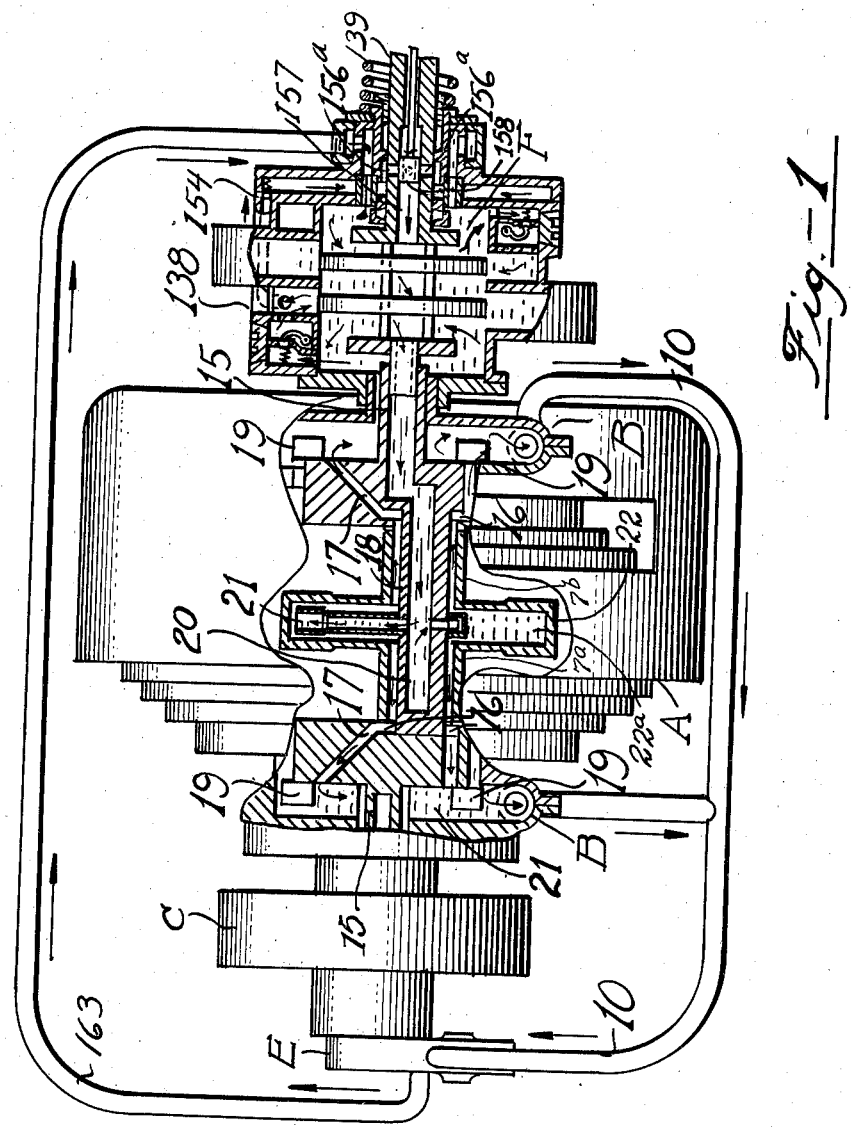

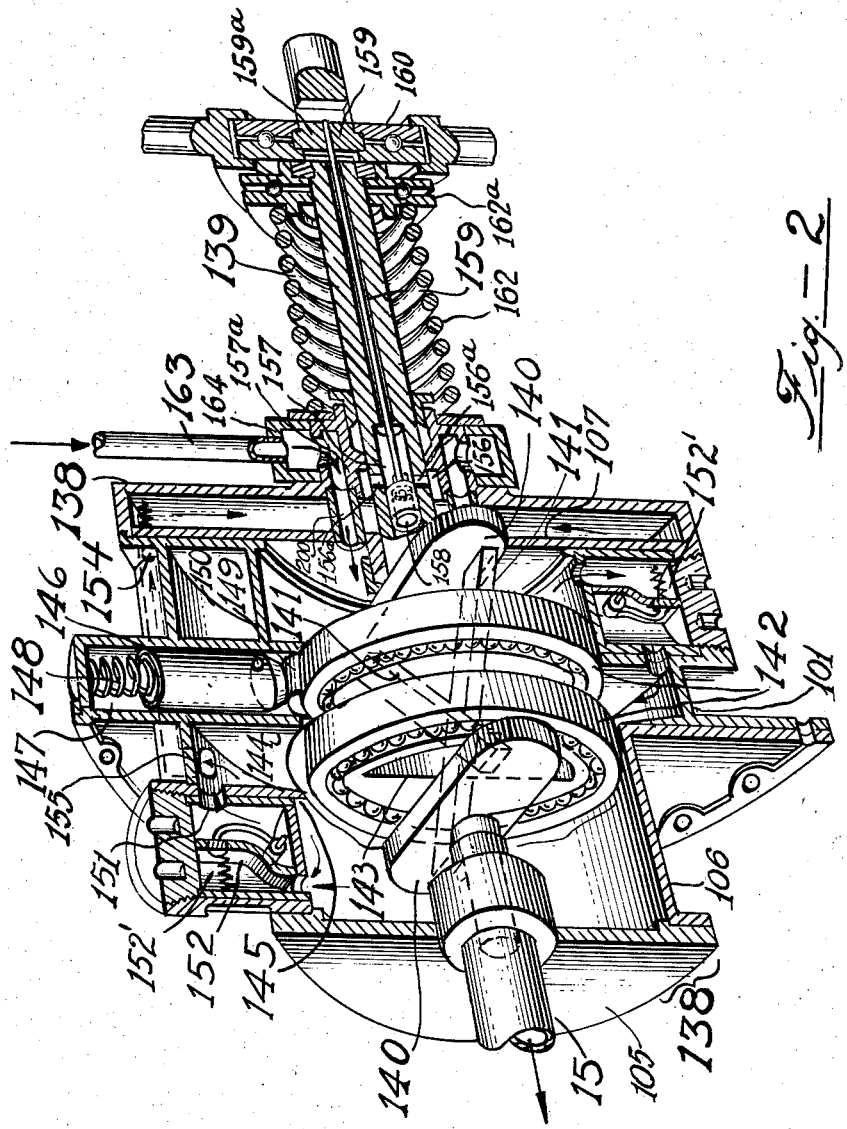

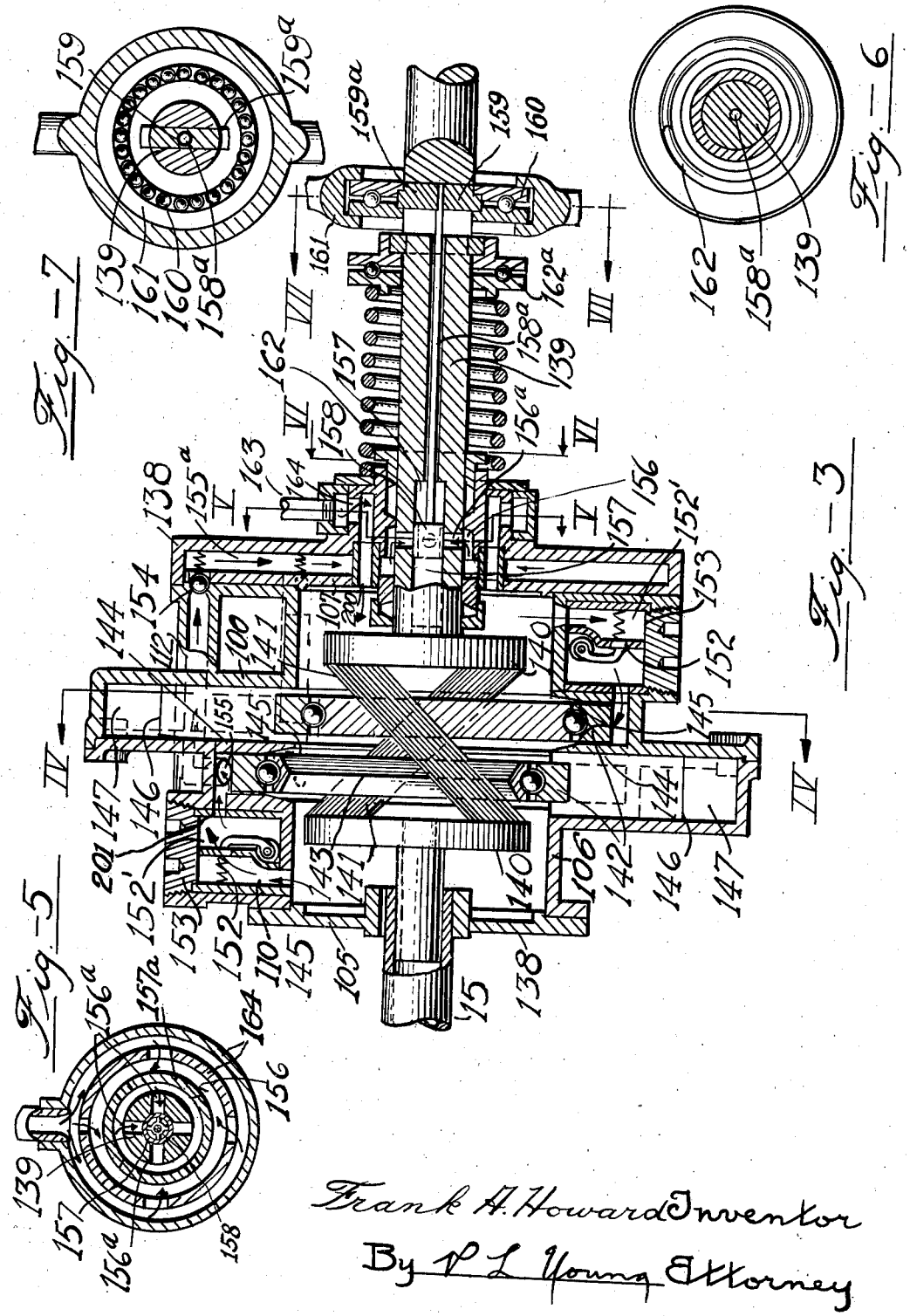

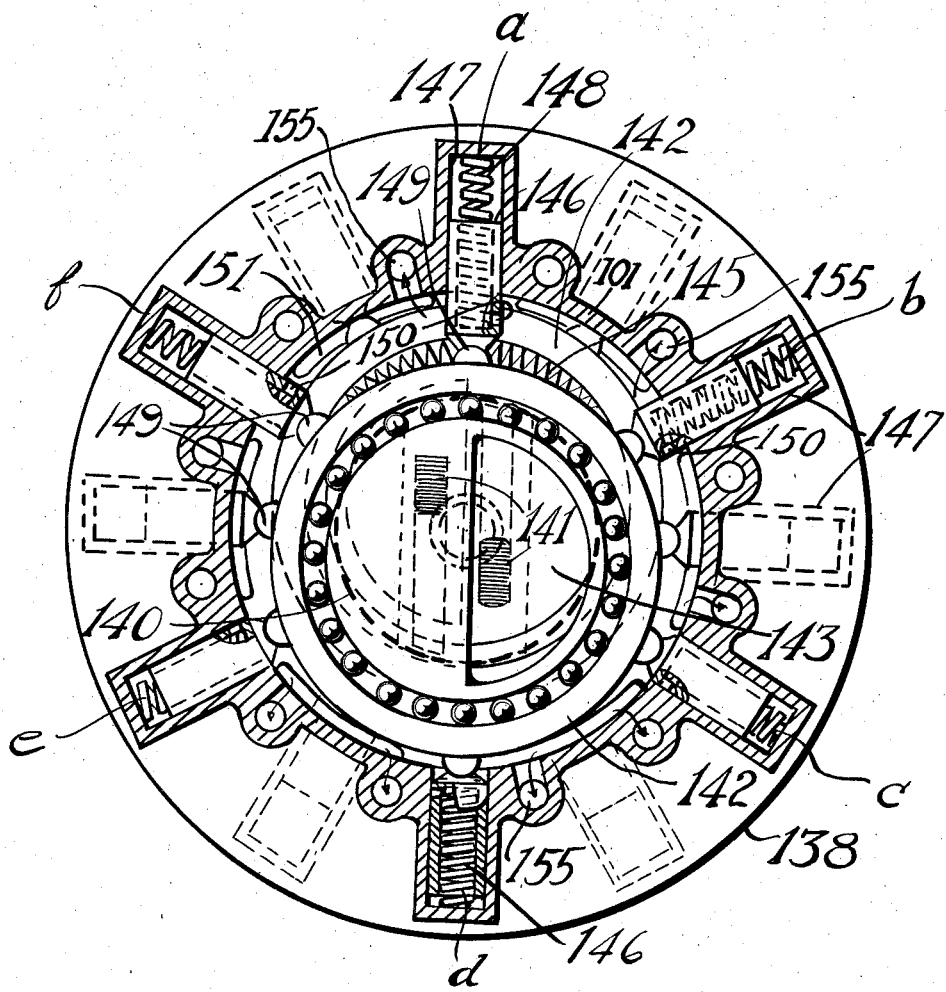

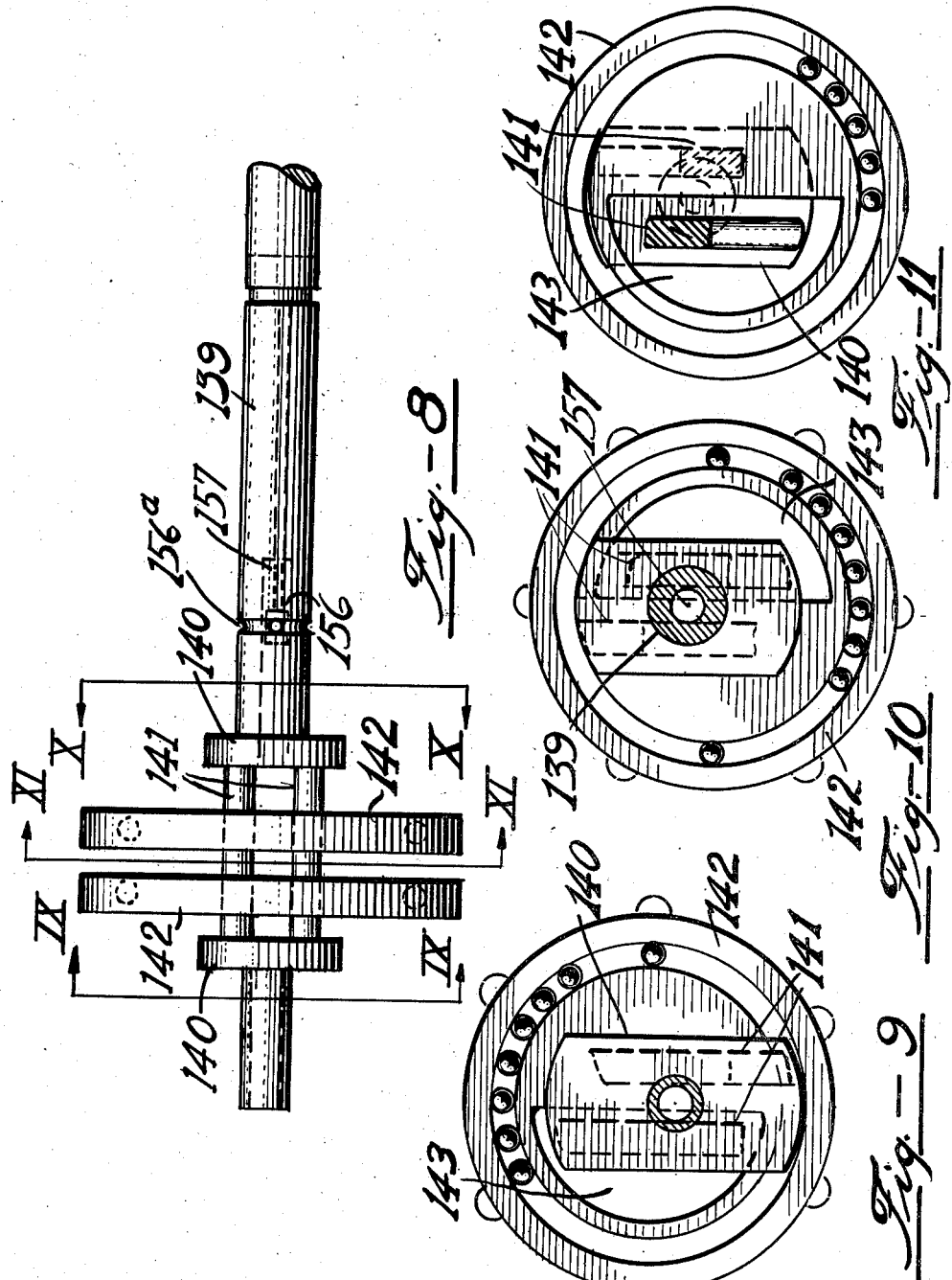

Frank A. Howard Inventor
By V. L. Young Attorney

Patented Aug. 19, 1941

2,253,299

UNITED STATES PATENT OFFICE 2,253,299

ROTARY CLUTCH

Frank A. Howard, Elizabeth, N. J.

Original application January 3, 1933, Serial No. 650,018. Divided and this application April 2, 1938, Serial No. 199,551

6 Claims. (Cl. 192—53)

This invention relates to a propulsive unit which includes an internal combustion engine and a liquid coupling for transmitting the power of the engine to the load and means for circulating lubricating liquid from the engine through the coupling where it is cooled and then back to the engine.

The invention relates also to a fluid displacement machine or clutch in which positive displacement of a working fluid against pressure is effected by power applied to the driving of the machine. While the motion of the displacing member is one of rotation, there is a supplementary reciprocating motion essential to the operation.

In all such positive fluid displacement machines the fundamental kinematic problem is that of expanding and contracting the working chambers and mechanically coupling the moving walls of these chambers to those portions of the machine which are intended to transmit power to or from them. In the rotary clutch the power is transmitted directly to or from a casing by a moving chamber wall in the form of a rotating ring called the rotor journalled on the crank pin. This moving wall is supplemented by partitioned walls called vanes which also move, but only by reciprocating in their own planes, and therefore against frictional resistance alone.

In the kinematic design the positive motion of the rotor is that of an eccentric strap with an infinitely long connection rod, but in addition to this positive motion, it is free to slip or drift by rotation on its own axis under unbalanced frictional forces, such drift being immaterial to its displacement motion but of great practical importance. The motion of the vanes is one of rectilinear reciprocation in planes parallel with their surfaces exposed to the working fluid.

In order to show the range of practical application of the invention, it has been illustrated primarily in the form of a complete rotary power unit comprising a two-cycle rotary internal combustion engine and a rotary oil clutch or coupling through which the power is transmitted from the engine to the load or from the load to the engine for braking action.

The invention will be fully understood from the following description, taken in connection with the accompanying drawings, in which latter—

Figure 1 is a side elevational view, with parts broken away, of the internal combustion engine and the rotary oil clutch, showing the circulation of oil for cooling the engine;

Fig. 2 is a perspective view of the clutch mechanism, with the clutch disengaged;

Fig. 3 is a longitudinal sectional view of the clutch mechanism, showing the clutch in its maximum operating position;

Fig. 4 is a transverse sectional view taken along the line IV—IV of Fig. 3;

Fig. 5 is a transverse sectional view taken along the line V—V of Fig. 3;

Fig. 6 is a transverse sectional view taken along the line VI—VI of Fig. 3;

Fig. 7 is a transverse sectional view taken along the line VII—VII of Fig. 3;

Fig. 8 is a detailed side elevational view showing the clutch shaft and associated parts in position non-operative for the transmission of power;

Fig. 9 is a transverse sectional view taken along the line IX—IX of Fig. 8;

Fig. 10 is a transverse sectional view taken along the line X—X of Fig. 8;

Fig. 11 is a transverse sectional view taken along the line XI—XI of Fig. 8;

Figure 12:
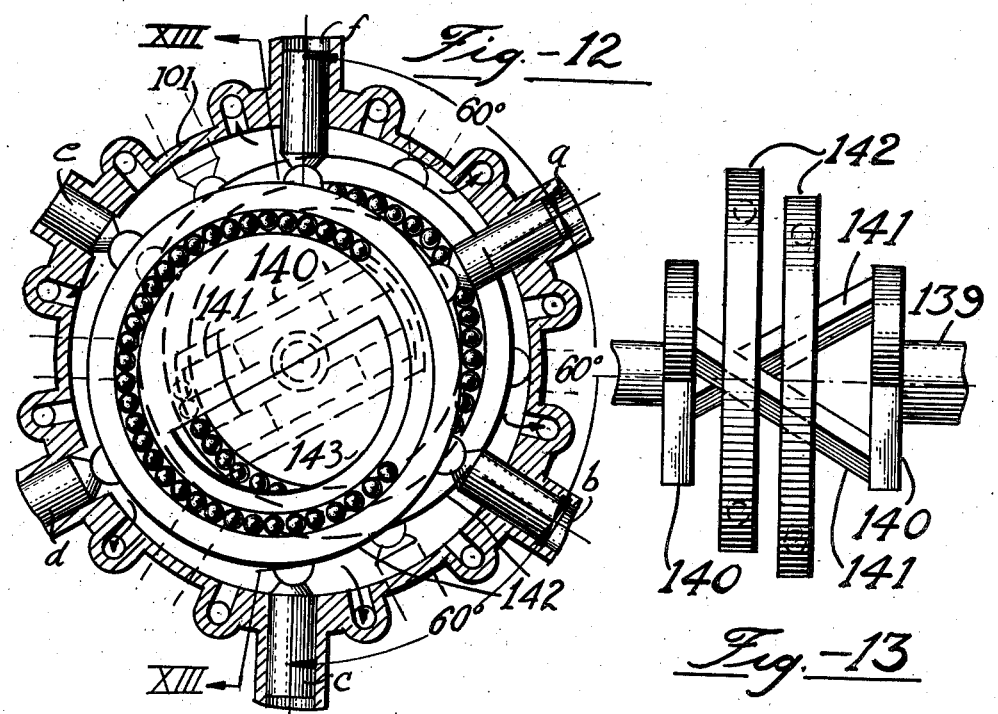
Fig. 12 is a fragmentary transverse sectional view through the clutch casing, showing in side elevation the relative position of the rotors and vanes when the rotors are passed to a position 60° beyond that illustrated in Fig. 4.
Figure 13:
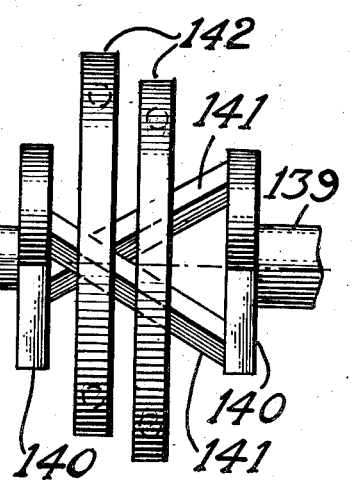
Fig. 13 is a side view taken along the line XIII—XIII of Fig. 12.

This application is a division of my previously filed application Ser. No. 650,018, entitled "Rotary engine," filed January 3, 1933 now U. S. Patent No. 2,112,844, issued April 5, 1938. Reference is also made to my application Ser. No. 683,593, filed August 4, 1933, which matured into U. S. Patent No. 2,087,619 on July 20, 1937 for an illustration of the clutch mechanism.

Referring more particularly to Fig. 1 of the drawings, there is illustrated a two-cycle rotary internal combustion engine designated A, equipped with integral blowers designated B, a rotary compressor designated C taking a small proportion of highly carburetted air from a carburation system (not shown) and delivering it under pressure to the engine A, an oil circulating pump E receiving the lubricating and cooling oil scavenged from the engine through conduit 10 and delivering the same under pressure through a conduit 163 to a rotary oil clutch F which serves also by virtue of its rotation in free air as an oil cooler, thence to the crank shaft of the engine back to the engine. Thus the engine oil is used for both lubricating and cooling and power transmission.

The engine construction comprises a crank shaft designated 15 which is a single throw counter-balanced split shaft of the general type used in radial engines. The main drive is taken from the right hand end, as viewed in Fig. 1, with which there is integrally forged the right counterweight and the crank pin 18, both crank shaft 15 and crank pin 18 being hollow to provide for introduction of cooling and lubricating oil.

The left hand end of the crank pin 18, as viewed in Fig. 1, is secured to the integral cheek of the right hand end of the shaft 15. The opposed faces of the cheeks of the crank throws of the shaft have grooves 16 turned in them surrounding the crank pin and communicating with bores 17 through the counterweights. These grooves and radially inclined bores serve as centrifugal pumps to collect and discharge the oil fed in through the bore 20 of the crank shaft. Radial flanges 19 fixed to the outer faces of the counterweights and crank throws act as the impellers of centrifugal scavenging pumps, as will later appear. A radial discharge nozzle 21 for cooling oil, removably attached to the center of the crank pin and communicating with its bore through radial ports, completes the crank shaft assembly. The rotor 22 of the engine is in the form of a hollow cylinder with hubs 7a and 7b extending the length of the crankpin 18 and constituting the crankcase. The interior of the rotor 22 is hollow, constituting an annular recess at 22a.

The rotor is internally cooled by lubricating oil supplied by the nozzle 21. Special provision must be made to effect satisfactory cooling with this medium. The requirement to be met is that oil must be supplied at an adequate rate to limit the average temperature rise, and that there must be high velocity turbulent circulation over the surfaces to be cooled. The first requirement is met by providing a circulating pump E of adequate capacity and appropriately large delivery passages. The second requirement is met by extending the delivery nozzle 21 out to the inner periphery of the annular recess 22a of the rotor, as shown in Fig. 1, and by making it wide enough to act as an effective impeller. Since this nozzle is fastened to, and rotates with, the crank shaft, while the rotor itself has no definite motion of rotation with respect to the casing, the nozzle acts as an impeller to circulate the entire body of oil around within the rotor at crank shaft speed.

The incoming fresh oil discharged from the fluid clutch by way of the communicating bore 20 in the engine crankshaft and the nozzle 21 is delivered at the periphery by the nozzle 21 under pump pressure and forced out at the center through the grooves in the outer faces of the bearing bushings of the rotor pump. Centrifugal force plays no part in the supply of the cooling oil or its internal circulation, both being positive displacement actions varying directly with engine speed. Centrifugal action is relied upon, however, to remove the oil from the collecting grooves 16 at a rate in excess of its supply to prevent the building up of a pressure in these grooves and also for scavenging the compartments in the end casings 23 into which the oil collects.

When using the rotary power unit for automotive vehicles the fluid clutch permits of indefinitely extended controllable slippage with full and continuous torque. This in turn permits of the substitution of an emergency low speed and a reverse gear for the variable speed transmissions now employed in automobiles, the increase of driving torque and higher motor speeds gained from such transmissions being not required with the rotary engine. The permissible rotation speed of the latter, as well as its torque, is so high that under its normal or direct drive gear ratio, it delivers the maximum torque required for ordinary starting acceleration and hill climbing.

In Figs. 2 and 3, the rotary clutch or casing is shown as an individual unit. The casing thereof, designated 138, is the driving member in ordinary service, although the mechanism is fully reversible. The driven member is a shaft 139 passing through a stuffing box and bearing in one end of the casing and having a pilot bearing in the other end of the casing. Within the casing the shaft is divided, each end carrying a T-head 140, the two heads being joined by crank pins in the form of inclined splined bars 141 which lie in offset planes on either side of and parallel with an axial plane of the shaft. The twin rotors or cylindrical pistons 142 are formed as annular ball bearings, the inner race of each being carried by one of the bars 141 which passes through an inclined splined hole therein. Each inner race is cut out on one side as shown at 143 to clear the bar on which the other race is mounted. Each of the rotors operates in a separate chamber of the casing, the two chambers being separated by a common wall 144. This wall, as well as the outer face walls 100 of the chambers, has leakage grooves 145 milled in its surface, the grooves being of maximum depth and width at the inner ends and tapering to points at the outer ends. The leakage grooves 145 are of substantially V-shape, increasing in width and depth toward the center of the chambers. The outer ends lie on a circle of about the mean radius of the chamber, leaving the outer portion of the chamber walls unaffected.

Figure 14:
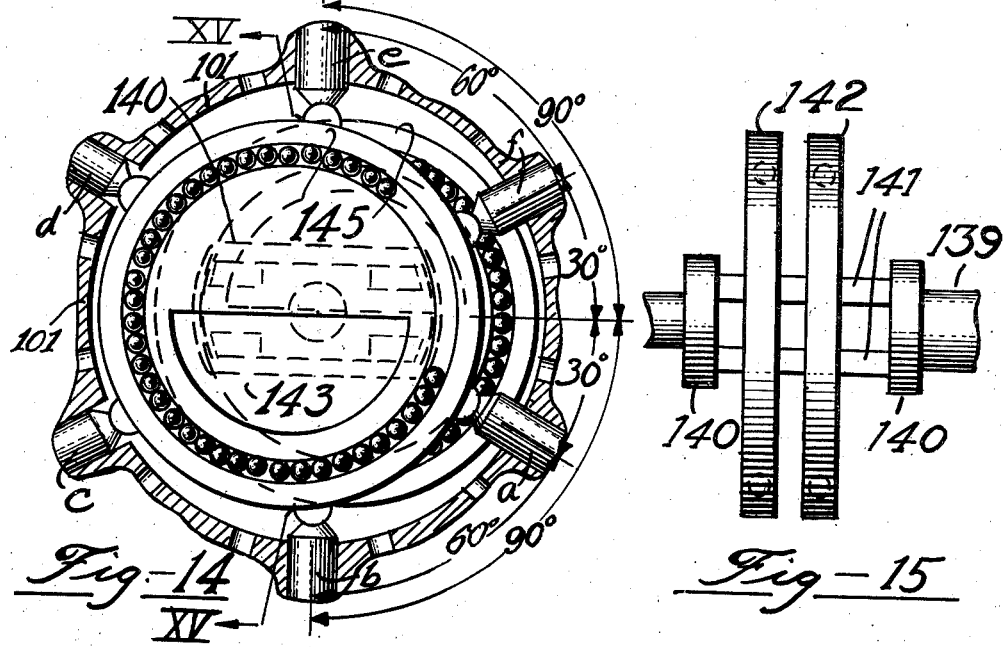
Fig. 14 is a view similar to Fig. 12 when the rotors have passed to a position 90° beyond that shown in Fig. 4.
Figure 15:
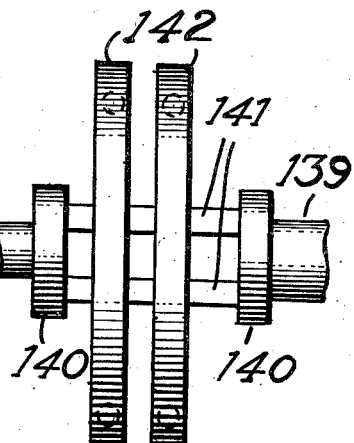
Fig. 15 is a longitudinal sectional view taken along the line XV—XV of Fig. 14.

Each working chamber comprising an annular wall 101 and side walls 144 and 100 is subdivided into compartments by vanes 146 sliding in cylinders 147 which also house compression springs 148 which hold the contact shoes 149 in contact with the rotor surface. The vanes are hollow and are vented on one side as shown at 150 to open into the working chamber on that side. Each of the two rotary units has six vanes. The two sets of vanes may coincide angularly for easy balancing, or may be staggered, the latter construction being here shown for clarity. The cylinders 147 have been designated a to f in Figs. 12 and 14.

For admission of the working fluid to the working chambers the latter have liberal inlet ports 151 (see Fig. 4) in their outer side faces. The crankcase is formed by the walls 105, 106 and 107. The fluid is supplied from the crankcase to the ports 151 through passages 110 in the wall 106 and automatic inlet valves 152 carried in cages 152' which are held in the wall 106 of the casing by closure plugs 153, the valves 152 designed to be unaffected by centrifugal force, the seat lying in the radial line of the pivot. From valves 152 the fluid flows through passages 201 to the working chambers. In the general view, the inlet valves have been illustrated as simple gate valves moving in a line parallel with the axis of rotation.

A ball valve construction is illustrated in connection with the outlet valves 154. The latter prevent inflow through the outlet or relief ports 155 and passage 112 which communicate with the top or arcuate wall 101 of each working chamber and by appropriate passages 155a and ducts 9 in the casing with a groove 156 formed by the annular wall 157a surrounding the shaft 139. The portion of the shaft adjacent this groove has radial ports 156a opening into a central bore 157 drilled in from the T-head of the shaft and thus opening to the crankcase. To control flow of oil from the outlet ports to the crankcase through the ducts described, there is provided a plunger valve 158 fitting the bore 157 and having a stem 158a which passes outward through the shaft 139 to a point of attachment to a T-head 159 sliding in a slot through the shaft. The outer prongs 159a of the T-head 159 are loosely engaged between the races of a ball thrust bearing 160 which is operable by a ring 161 with which the clutch operating yoke, not shown, is connected.

It will be clearly seen from the above description with reference to Figs. 2 and 3, that the driving shaft is the shaft 15 at the left hand end of Fig. 3. This shaft is keyed to the casing or housing 138 and turns with it as one piece. The driven shaft 139 comprises a journal having a bearing in the driving shaft, T-heads 140 connected by splined members 141, and the straight length of shaft to the right of these.

The twin rotors 142 turn with the driven shaft 139 at an eccentricity depending on the horizontal position of the driven shaft 139. The twin rotors run on ball bearings, the inner races being formed in the circumference of the rotors and the outer races in rings which are held against the shoes 149 of the vanes 146 by spring concontact. One possible motion of a ring is that with the driving shaft fixed and only the driven shaft rotating, every point in it revolves in a circle of radius equal to the eccentricity. This is slightly modified by shifting or drifting of the ring on its own center. This latter motion is entirely accidental and free from positive constraint, but it in no way affects the periodic expansion and contraction in a cross sectional plane, as shown in Fig. 4, of the spaces between the vanes, the casing 138, and the ring.

The clutch is normally held in the fully engaged position shown in Fig. 3 by spring 162 bearing at one end against the casing and at the other against a thrust collar 162a and bearing on the shaft 139. Fluid may be supplied continuously to and through the clutch casing by a pipe 163 which enters a hollow gland 164 riding on a boss on the face of the casing and communicating with the crankcase through the ducts 200 shown. From the crankcase the fluid may be discharged through a bore in the driving shaft as described in connection with Fig. 1. It will be understood, however, that if the casing be initially filled with oil or other liquid, no continuous supply or discharge is required for operation of the clutch, and the pipe 163 and gland 164 may be omitted in such cases, the cluth with its initial filling being a complete self-contained unit.

The operation of the clutch is as follows: The rotors 142 are in their position of extreme eccentricity in Fig. 3. In this position, the maximum driving force is transmitted from the driving shaft 15 through the fluid in the working chambers to the driven shaft 139 since the fluid is considered to be an imcompressible fluid. In this position, the T-head 140 is in substantial engagement with the right hand wall of the casing 138. Escape of the fluid from the working chambers is prevented by means of the plunger valve 158 which is in the position as shown in Fig. 3, to block the ports 156a.

The clutch can be disengaged by moving the rotors to their concentric position illustrated in Fig. 2, as will now be described. The ring 161 controls the position of the plunger valve 158 by means of rod 158a. The ring 161 is moved to the left as viewed in Fig. 3, to the position shown in Fig. 2, in which the plunger valve which is of hollow construction is disposed to the left of the ports 156a to permit free passage of the trapped fluid from the working chambers through the passages 112, 155a, ports 156a and bore 157, into the crankcase of the clutch. The ring 162a which controls the longitudinal position of the driven shaft 139 is now moved to the left as viewed in Fig. 3, until the T-head 140 substantially abuts against the left hand wall 105 of the casing 138. This is the position illustrated in Fig. 2. Passage of the bars 141 through the inclined holes of the rotors 142 has retracted the rotors to their concentric position. Additional escape of fluid from the working chambers to facilitate the shifting of the position of the rotors is facilitated by the leakage grooves 145 provided in the walls of the working chambers.

To shift now from the concentric position of the rotors 142 illustrated in Fig. 2, to the extreme eccentric position of the rotors illustrated in Fig. 3, and assuming that the plunger valve 158 is still in its position to the left of the ports 156a to permit free flow of fluid from the working chambers, the spring is permitted to press the collar 162a to the right, as viewed in Figs. 2 and 3. The pressure of the spring 162 moves the driven shaft 139 to the right until the T-head 140 is in substantial abutment against the right hand wall of the chamber 138. This movement of the driven shaft 139, with the bars 141 affixed thereto, moves the rotors 142 outward to the extreme eccentric position illustrated in Fig. 3. The collar 161 is now moved to the right as viewed in Figs. 2 and 3, to the position illustrated in Fig. 3, thereby positioning the plunger valve 158 to cut off escape of the fluid trapped in the working chambers. Full driving force can now be transmitted from the driving shaft and casing 138 through the fluid in the working chambers to the driven shaft 139.

I claim:

1. In a clutch, two shafts co-axial with respect to each other, a casing rigidly secured to the first shaft and encircling the adjoining end of the second shaft, an annular chamber in the casing, a cylindrical piston secured to the second shaft contacting with the side and end walls of the chamber, movable mechanism cooperating with the piston to divide the chamber circumferentially into compartments, means for varying the radial position of the piston with respect to the second shaft, the compartments adapted to contain fluid whereby rotation of the casing transmits torque to the piston through the fluid when the piston is in off-centered position, and V-shaped grooves in the side walls of the annular chamber extending radially outwardly from the base of the annular chamber increasing in width and depth toward the center of the chamber to permit of controlled leakage of the oil from the chamber.

2. In a clutch, two shafts co-axial with respect to each other, a casing rigidly secured to the first shaft and encircling the adjoining end of the second shaft, an annular chamber in the casing, a cylindrical piston secured to the second shaft contacting with the side and end walls of the chamber, movable mechanism cooperating with the piston to divide the chamber circumferentially into compartments, passageways leading from the casing to the compartments and containing a one-way valve to permit one-way passage of the fluid from the casing to the compartments, a discharge passageway leading from each compartment to a single bore leading to the casing, and a manually controlled valve in the bore operative to close the flow of fluid from the compartments into the casing whereby rotation of the casing transmits torque to the piston through the fluid when the piston is in off-centered position.

3. In a fluid clutch, two shafts coaxial with respect to each other, a casing adapted to contain fluid rigidly secured to the first shaft and encircling the adjoining end of the second shaft, an annular chamber in the casing, a cylindrical piston contacting with the side and end walls of the chamber, means for dividing the chamber circumferentially into compartments, a bar secured to the second shaft inclined to the longitudinal axis of the shaft and slidably engaging a hole in the piston whereby longitudinal movement of the second shaft effects radial movement of the piston, inlet passageways leading from the casing to the compartments, a discharge passageway leading from each compartment to a single bore leading to the casing, and a valve in the bore operative to open the flow of fluid from the compartments into the casing whereby radial movement of the piston is permitted.

4. In a fluid clutch for transmitting power between a casing and a shaft, a casing encircling the adjoining end of the shaft, an annular chamber in the casing, a cylindrical piston contacting with the side and end walls of the chamber, means for dividing the chamber circumferentially into compartments, inlet passageways leading from the casing to the compartments, a discharge passageway leading from each compartment to a single bore leading to the casing, a valve in the bore operative to open the flow of fluid from the compartments into the casing whereby radial movement of the piston is permitted, and means for effecting radial movement of the piston.

5. A fluid clutch according to claim 3 in which a one-way valve is disposed in each inlet passageway and discharge passageway to permit one-way passage of the fluid from the casing to the compartments and from the compartments to the single bore.

6. In a fluid clutch, a casing encircling the adjoining end of a shaft, annular chambers in the casing, a cylindrical piston contacting with the side and end walls of each chamber, means for dividing each chamber circumferentially into compartments, diagonally crossing bars integral with the shaft each slidably engaging a hole in one of the pistons whereby longitudinal movement of the shaft effects opposite radial movement of the pistons, inlet passageways leading from the casing to the compartments, a discharge passageway leading from each compartment to a single bore leading to the casing, and a valve in the bore operative to open the flow of fluid from the compartments into the casing whereby radial movement of the pistons is permitted.

FRANK A. HOWARD.